(12) United States Patent
Thubert et al.

(10) Patent No.: US 10,298,346 B2
(45) Date of Patent: May 21, 2019

(54) DIRECTED ACYCLIC GRAPH OPTIMIZATION BASED ON TIMING INFORMATION FOR GENERATING OPTIMIZED NETWORK CLOCK

(71) Applicant: Cisco Technology, Inc., San Jose, CA (US)

(72) Inventors: Pascal Thubert, La Colle sur Loup (FR); Laurent Montini, Saint-Arnoult-en-Yvelines (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 344 days.

(21) Appl. No.: 15/171,518

(22) Filed: Jun. 2, 2016

(65) Prior Publication Data
US 2017/0353292 A1     Dec. 7, 2017

(51) Int. Cl.
*H04J 3/06* (2006.01)
*H04W 40/02* (2009.01)
(Continued)

(52) U.S. Cl.
CPC .......... *H04J 3/0679* (2013.01); *H04J 3/0635* (2013.01); *H04W 4/70* (2018.02); *H04W 40/02* (2013.01); *H04W 56/00* (2013.01); *H04W 56/0015* (2013.01); *H04L 67/12* (2013.01); *H04W 84/18* (2013.01)

(58) Field of Classification Search
CPC ...... H04J 3/0635; H04J 3/0638; H04J 3/0641; H04J 3/0658; H04J 3/0661; H04J 3/0667; H04J 3/0673; H04J 3/0679; H04J 3/0685; H04J 3/0697; H04W 56/001; H04W 56/0015; H04W 56/004; H04W 56/005; H04W 56/0055; H04W 84/18;
(Continued)

(56) References Cited

U.S. PATENT DOCUMENTS 4,142,069 A *  2/1979  Stover ................... H04J 3/0679
                                                        370/507
7,656,857 B2   2/2010  Thubert et al.
(Continued)

OTHER PUBLICATIONS

Dai et al., "TSync: a lightweight bidirectional time synchronization service for wireless sensor networks." ACM SIGMOBILE Mobile Computing and Communications Review, vol. 8, No. 1, Jan. 2004, pp. 125-139.*

(Continued)

*Primary Examiner* — Normin Abedin
*Assistant Examiner* — William C McBeth
(74) *Attorney, Agent, or Firm* — Leon R. Turkevich (57) ABSTRACT

In one embodiment, a method comprises receiving, by a network device, one or more advertisement messages comprising timing information describing a quality of a network clock that is originated by a master clock device at a root of a directed acyclic graph (DAG); the network device executing an objective function for the DAG providing an optimized loopless time topology for the network clock, synchronized to the master clock device, based on the timing information; and the network device attaching to a parent device in the DAG based on the objective function, for optimized generation of the network clock by the network device.

20 Claims, 5 Drawing Sheets

(51) Int. Cl.
*H04W 56/00* (2009.01)
*H04W 4/70* (2018.01)
*H04L 29/08* (2006.01)
*H04W 84/18* (2009.01)

(58) Field of Classification Search
CPC ...... H04W 40/02; H04W 40/12; H04L 12/44; H04L 67/12
See application file for complete search history.

(56) References Cited

U.S. PATENT DOCUMENTS

| | | | |
|---|---|---|---|
| 7,693,064 B2 | 4/2010 | Thubert et al. | |
| 2004/0005902 A1* | 1/2004 | Belcea | H04J 3/0667 455/502 |
| 2007/0147562 A1* | 6/2007 | Eidson | H04J 3/0667 375/354 |
| 2009/0122782 A1* | 5/2009 | Horn | H04J 3/0679 370/350 |
| 2009/0290572 A1* | 11/2009 | Gonia | H04J 3/0641 370/350 |
| 2010/0177666 A1* | 7/2010 | Cheng | H04J 3/0641 370/254 |
| 2011/0116389 A1* | 5/2011 | Tao | H04W 40/22 370/252 |
| 2011/0255546 A1* | 10/2011 | Le Pallec | H04J 3/0679 370/400 |
| 2013/0016612 A1* | 1/2013 | Vasseur | H04L 45/48 370/235 |
| 2013/0208735 A1* | 8/2013 | Mizrahi | H04J 3/0661 370/503 |
| 2014/0006595 A1* | 1/2014 | Leighton | H04J 3/0638 709/224 |
| 2015/0156736 A1* | 6/2015 | Guo | H04W 56/001 370/350 |
| 2016/0094335 A1* | 3/2016 | Roberts | H04L 7/04 375/356 |
| 2016/0182214 A1* | 6/2016 | Chen | H04J 3/0641 709/248 |
| 2016/0345317 A1* | 11/2016 | Levesque | H04W 40/12 |
| 2018/0262401 A1* | 9/2018 | Shah | H04W 4/38 |

OTHER PUBLICATIONS

Duquennoy et al., "Orchestra: Robust mesh networks through autonomously scheduled TSCH", Proceedings of the 13th ACM Conference on Embedded Networked Sensor Systems, Nov. 2015, pp. 337-350.*
Gurewitz et al., "Network classless time protocol based on clock offset optimization," in IEEE/ACM Transactions on Networking, vol. 14, No. 4, Aug. 2006, pp. 876-888.*
IEEE Standard for a Precision Clock Synchronization Protocol for Networked Measurement and Control Systems, in IEEE Std 1588-2008 (Revision of IEEE Std 1588-2002), Jul. 2008, pp. front cover, i, 16-18, 31-40, 83-90, 128-129 and 163.*
Li et al., "Clock Synchronization of Wireless Distributed System Based on IEEE 1588," 2010 International Conference on Cyber-Enabled Distributed Computing and Knowledge Discovery, 2010, pp. 205-209.*
Rathore et al., "LevelSync: A hierarchical time synchronization mechanism for wireless sensor networks," 2014 Seventh International Conference on Contemporary Computing (IC3), 2014, pp. 276-282.*
Schmid et al., "A case against routing-integrated time synchronization", Proceedings of the 8th ACM Conference on Embedded Networked Sensor Systems, Nov. 2010, pp. 267-280.*
Shen et al., "Agent-Based Timing-Sync Algorithm for Sensor Networks," 2009 International Conference on Networks Security, Wireless Communications and Trusted Computing, 2009, pp. 338-344.*
Palattella et al., "Standardized Protocol Stack for the Internet of (Important) Things", IEEE Communications Surveys & Tutorials, vol. 15, No. 3, 2013, pp. 1389-1406 (Year: 2013).*
Antonova et al., "Standard profile for use of IEEE std 1588-2008 precision time protocol (PTP) in power system applications", 2013 66th Annual Conference for Protective Relay Engineers, College Station, Texas, Apr. 8-11, 2013, pp. 322-336.
Schriegel et al., "Investigation in Automatic Determination of Time Synchronization Accuracy of PTP Networks with the Objective of Plug-and-Work", 2014 International IEEE Symposium on Precision Clock Synchronization for Measurement, Control and Communication, Sep. 24, 2014, Austin, TX, 27 pages.
Thubert, Ed., "An Architecture for IPv6 over the TSCH mode of IEEE 802.15.4", [online], Nov. 26, 2015, [retrieved on Jan. 27, 2016]. Retrieved from the Internet: <URL: https://tools.ietf.org/pdf/draft-ietf-6tisch-architecture-09.pdf>, pp. 1-47.
Sudhaakar et al., "6TiSCH Resource Management and Interaction using CoAP", [online], Mar. 9, 2015, [retrieved on Jan. 27, 2016]. Retrieved from the Internet: <URL: https://tools.ietf.org/pdf/draft-ietf-6tisch-coap-03.pdf>, pp. 1-16.
Vilajosana et al., "Minimal 6TiSCH Configuration", [online], Jan. 16, 2016, [retrieved on Jan. 27, 2016]. Retrieved from the Internet: <URL: https://tools.ietf.org/pdf/draft-ietf-6tisch-minimal-14.pdf>, pp. 1-28.
Palattella, et al., "Terminology in IPv6 over the TSCH mode of IEEE 802.15.4e", [online], Nov. 2, 2015, [retrieved on Jan. 27, 2016]. Retrieved from the Internet: <URL: https://tools.ietf.org/pdf/draft-ietf-6tisch-terminology-06.pdf>, pp. 1-14.
Winter, Ed., et al., "RPL: IPv6 Routing Protocol for Low-Power and Lossy Networks", Internet Engineering Task Force (IETF), Request for Comments: 6550, Mar. 2012, pp. 1-157.
Kirrman et al., "Coexistence of IEEE 1588, C37.238 and 802.1AS, Issues and Recommendations", [online], [retrieved on Jun. 6, 2016]. Retrieved from the Internet: URL: <http://lamspeople.epfl.ch/kirrmann/Pubs/PrecisionTime/ISPCS_2012_Clock_Coexistence_120717_HK.pdf>, pp. 1-6.
2014 International IEEE Symposium on Precision Clock Synchronization for Measurement, Control and Communication, Sep. 24-26, 2014, Austin, TX, IEEE Catalog Number: CFPI14PCS-CDR, 132 pages.
Ronen, Synchronization Monitoring in IEEE1588 Synchronization Networks, 2013 IEEE, pp. 95-100.
Vasseur, Ed., et al., "Routing Metrics Used for Path Calculation in Low-Power and Lossy Networks", Internet Engineering Task Force (IETF), Request for Comments: 6551, Mar. 2012, pp. 1-30.
Thubert, Ed., "Objective Function Zero for the Routing Protocol for Low-Power and Lossy Networks (RPL)", Internet Engineering Task Force (IETF), Request for Comments: 6552, Mar. 2013, pp. 1-14.
Vasseur, "Terms Used in Routing for Low-Power and Lossy Networks", Internet Engineering Task Force (IETF), Request for Comments: 7102, Jan. 2014, pp. 1-8.
Kirrmann, "Time quality transmission in IEC/IEEE 61850-9-3 and the C37.238 TLV", IEC/IEEE Joint Development 61850-9-3, Baden, Switzerland Jan. 4, 2016, 36 pages.
"Definitions and terminology for synchronization in packet networks", ITU-T Telecommunication Standardization Sector of ITU, Series G: Transmission Systems and Media, Digital Systems and Networks, Packet over Transport aspects—Quality and availability targets, Recommendation ITU-T G.8260, [online], Feb. 2012, [retrieved on May 4, 2016]. Retrieved from the Internet: URL: <http://www.itu.int/rec/T-REC-G.8260-201202-S>, 42 pages.
"Definitions and terminology for synchronization in packet networks, Amendment 1", ITU-T Telecommunication Standardization Sector of ITU, Series G: Transmission Systems and Media, Digital Systems and Networks, Packet over Transport aspects—Quality and availability targets, Recommendation ITU-T G.8260, Amendment 1, [online], Aug. 2013, [retrieved on May 4, 2016]. Retrieved from the Internet: URL: <http://www.itu.int/rec/T-REC-G.8260-201308-S!Amd1>, 14 pages.
"Definitions and terminology for synchronization in packet networks, Amendment 2: Amendment to the definition of time error", ITU-T Telecommunication Standardization Sector of ITU, Series G: Transmission Systems and Media, Digital Systems and Networks, (56) References Cited

OTHER PUBLICATIONS

Packet over Transport aspects—Quality and availability targets, Recommendation ITU-T G.8260, Amendment 2, [online], May 2014, [retrieved on May 4, 2016]. Retrieved from the Internet: URL: <http://www.itu.int/rec/T-REC-G.8260-201405-S!Amd2>, 8 pages.

Wikipedia, "Precision Time Protocol", [online], Mar. 15, 2016, [retrieved on Mar. 18, 2016]. Retrieved from the Internet: URL: <https://en.wikipedia.org/w/index.php?title=Precision_Time_Protocol&printable=yes>, pp. 1-8.

Wetterwald et al., U.S. Appl. No. 15/089,711, filed Apr. 4, 2016.

Watteyne, Ed. et al, "Using IEEE 802.15.43 Time-Slotted Channel Hopping (TSCH) in the Internet of Things (IoT): Prpblem Statement", Internet Engineering Task Force (IETF), Request for Comments: 7554, May 2015, pp. 1-23.

Precision time protocol telecom profile tor phase/time synchronization with full timing support from the network, ITU-T Telecommunication Standardization Sector of ITU, Series G: Transmission Systems and Media, Digital Systems and Networks, Packet over Transport aspects—Synchronization quality and availability targets Series Y: Global Information Infrastructure, Internet Protocol Aspects and Next-Generation Networks, Internet Protocol Aspects—Transport, Recommendation ITU-T G.8275.1/Y.1369 [online], Jul. 2014, [retrieved on Mar. 18, 2016]. Retrieved from the Internet: URL <https://www.itu.int/rec/T-REC-G.8275.1-201407-S>, 42 pages.

* cited by examiner

DIRECTED ACYCLIC GRAPH OPTIMIZATION BASED ON TIMING INFORMATION FOR GENERATING OPTIMIZED NETWORK CLOCK

TECHNICAL FIELD

The present disclosure generally relates to directed acyclic graph optimization based on timing information, for generating an optimized network clock.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function of the RPL instance. The "child" network device, upon attaching to its parent, can output its own DIO with updated network topology metrics that enable other network devices to discover the DODAG, learn the updated network topology metrics, and select a DODAG parent.

The Institute of Electrical and Electronics Engineers (IEEE) Standard 1588 Precision Time Protocol (PTP) describes a Best Master Clock Algorithm (BMCA) that requires building a spanning tree to propagate time; the BMCA, however, fails to account for any clock performance of any clocks in a data network, and the BMCA can be susceptible to path failures due to a link breakage in the spanning tree.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises receiving, by a network device, one or more advertisement messages comprising timing information describing a quality of a network clock that is originated by a master clock device at a root of a directed acyclic graph (DAG); the network device executing an objective function for the DAG providing an optimized loopless time topology for the network clock, synchronized to the master clock device, based on the timing information; and the network device attaching to a parent device in the DAG based on the objective function, for optimized generation of the network clock by the network device.

In another embodiment, an apparatus comprises a device interface circuit and a processor circuit. The device interface circuit is configured for receiving one or more advertisement messages comprising timing information describing a quality of a network clock that is originated by a master clock device at a root of a directed acyclic graph (DAG). The processor circuit is configured for executing an objective function for the DAG providing an optimized loopless time topology for the network clock, synchronized to the master clock device, based on the timing information. The processor circuit further is configured for causing the apparatus to attach to a parent device in the DAG based on the objective function, for optimized generation of the network clock by the apparatus.

In another embodiment, one or more non-transitory tangible media are encoded with logic for execution by a machine and when executed by the machine operable for: receiving, by the machine implemented as a network device, one or more advertisement messages comprising timing information describing a quality of a network clock that is originated by a master clock device at a root of a directed acyclic graph (DAG); the network device executing an objective function for the DAG providing an optimized loopless time topology for the network clock, synchronized to the master clock device, based on the timing information; and the network device attaching to a parent device in the DAG based on the objective function, for optimized generation of the network clock by the network device.

In another embodiment, a method comprises: providing, by a root network device, a master clock for a data network; and outputting by the root network device a advertisement message comprising routing information and timing information, the routing information identifying the root network device as a root of a directed acyclic graph (DAG), and the timing information describing a quality of the master clock.

The advertisement message enables network devices in the data network to establish, based on the timing information, an optimized loopless time topology for generation, by any one of the network devices, of a network clock that is optimized for the any one network device and synchronized to the master clock.

In another embodiment, an apparatus comprises a processor circuit and a device interface circuit. The processor circuit is configured for providing a master clock for a data network. The processor circuit further is configured for generating an advertisement message comprising routing information and timing information, the routing information identifying the root network device as a root of a directed acyclic graph (DAG), and the timing information describing a quality of the master clock. The device interface circuit is configured for outputting advertisement message into the data network. The advertisement message enables network devices in the data network to establish, based on the timing information, an optimized loopless time topology for generation, by any one of the network devices, of a network clock that is optimized for the any one network device and synchronized to the master clock.

DETAILED DESCRIPTION

Particular embodiments enable advertisement messages to include timing information that can describe a quality of a network clock that is originated by a master clock device at a root of a directed acyclic graph (DAG) of a data network. Each advertisement message (e.g., routing advertisement message, a RPL DIO message according to RFC 6550, etc.) generated and output by an attached network device belonging (i.e., attached) to the DAG can include not only routing topology information describing the attributes of the attached network device according to RFC 6550, but also can include timing information including different identifiable attributes describing the quality of the network clock available via the attached network device (e.g., generated by the attached network device).

The particular embodiments also enable a network device, having received the advertisement messages from different attached network devices, to execute an objective function that applies the received timing information to determine an optimization of the DAG providing a loopless time topology: the optimization of the DAG to provide an optimized loopless time topology enables the network device to identify a network path having minimal timing errors between the network device and the master clock device, and select the best parent device available for the network device to generate locally a network clock that is synchronized to the master clock device residing at the root of the DAG.

Hence, the example embodiments enable use of routing advertisement messages such as DIO messages (carrying timing information) and use of a time-optimized objective function to enable a network device to generate an optimized network clock, as an alternative to the Best Master Clock Algorithm. Moreover, the example embodiments enable the timing information to include static and dynamic timing information from the attached network devices and the master clock device, enabling the time-optimized objective function to calculate aggregated timing errors among the different available paths in the form of a routing metric (e.g., a RPL rank) for selection of a parent device having the best routing metric identifying a corresponding minimal aggregated timing error. Improvements over the BMCA include enabling a network device to establish its own optimized path, rerouting and path recovery based on selection of alternate parent(s), selection of a master clock in the presence of multiple DAGs for reaching respective master clocks, and recursive timesource aggregation that enables the network device to generate an aggregated network clock based on concurrent attachment to multiple DAGs providing synchronization to multiple respective master clocks.

Figure 1:
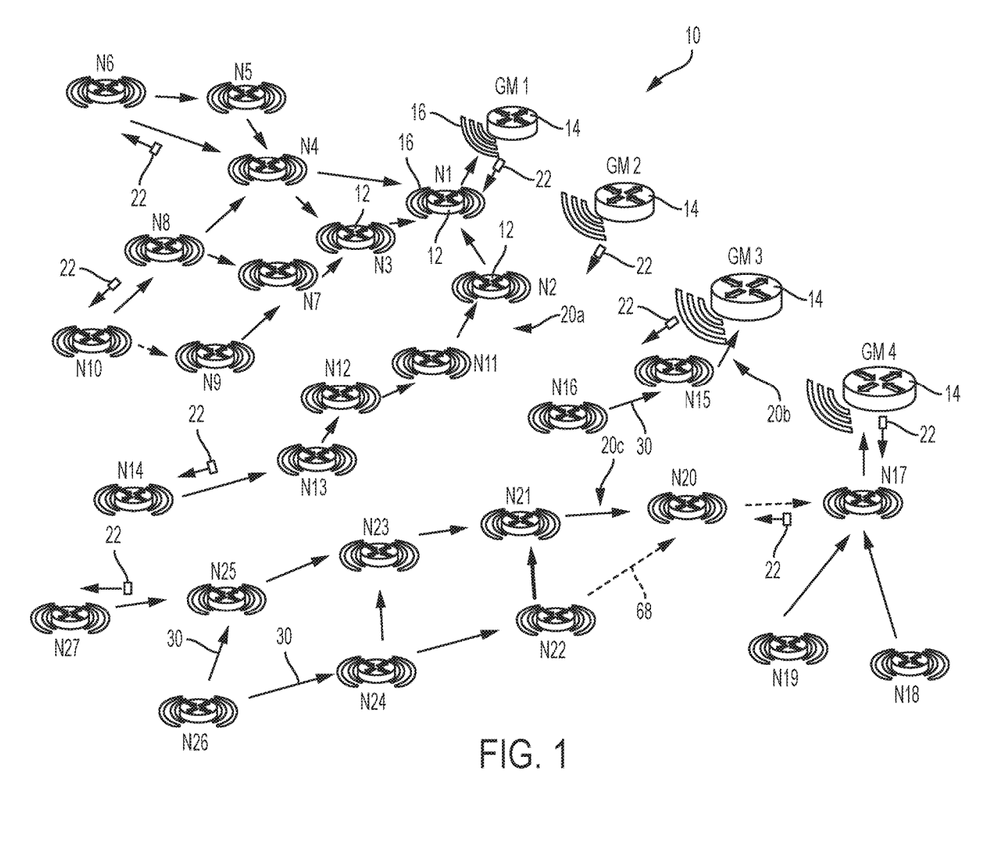
FIG. 1 illustrates an example system having an apparatus configured for optimized generation of a network clock within a directed acyclic graph rooted at a master clock device, according to an example embodiment.
Figure 2:
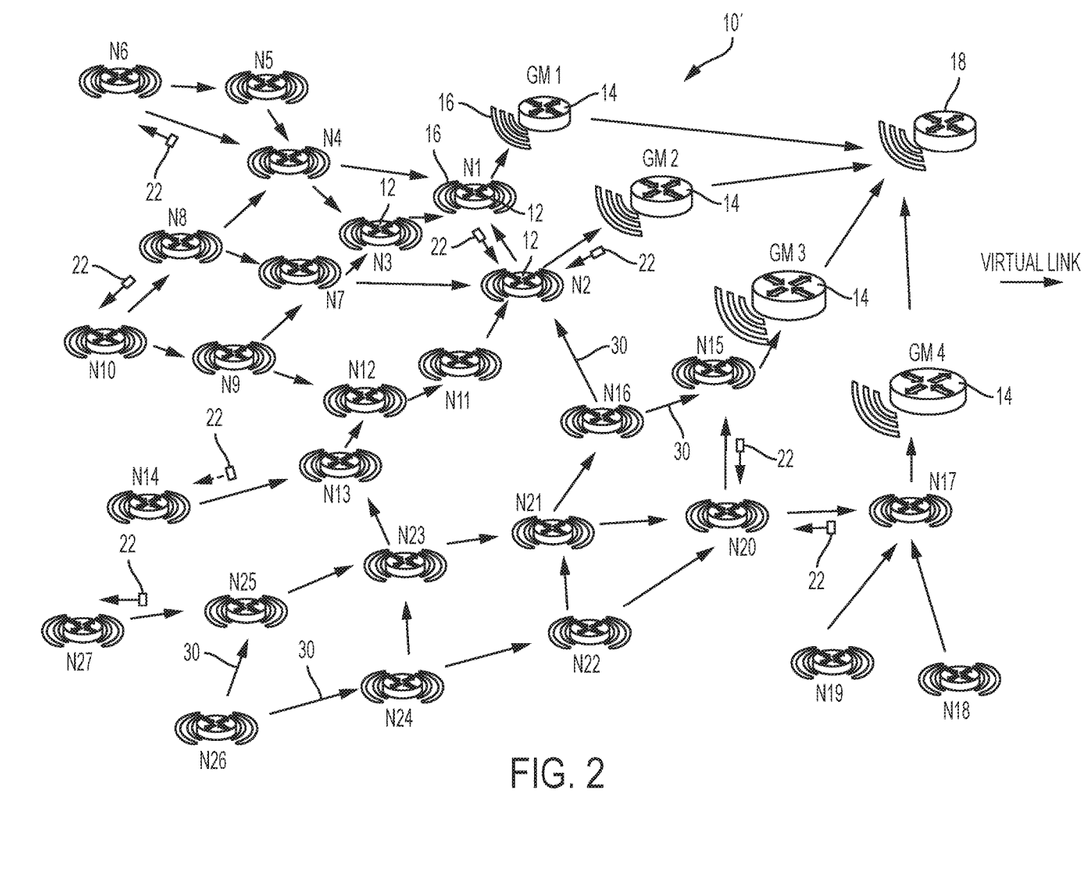
FIG. 2 illustrates second example system having an apparatus for optimized generation of a network clock within plural directed acyclic graphs rooted at respective master clock devices, according to an example embodiment.

FIGS. 1 and 2 are diagrams illustrating example data networks 10 or 10' each having network devices (e.g., N1-N27) 12 and master clock devices (GM-G4) 14, each network device 12 configured for optimized generation of a network clock originated by one or more of the master clock devices 14, according to an example embodiment. In one embodiment, the data networks 10 and 10' can be considered fully PTP-aware, where every network device 12 and 14 can generate, parse, and interpret data structures according to PTP protocol.

Each apparatus 12 and 14 is a physical machine (i.e., a hardware device) configured for implementing network communications with other physical machines 12 or 14 in the network 10 or 1 via wired or wireless data links, illustrated in FIGS. 1 and 2 as wireless data links 16 that form a wireless mesh network. The term "configured for" or "configured to" as used herein with respect to a specified operation refers to a device and/or machine that is physically constructed and arranged to perform the specified operation. Hence, each apparatus 12 or 14 is a network-enabled machine implementing network communications via the network 10.

Although only the network devices "N1", "N2", and "N3" are labeled with the reference numeral "12" in FIGS. 1 and 2 to avoid cluttering in the Figures, it should be apparent that all the network devices "N1" through "N27" are allocated the reference numeral "12" for purposes of the description herein. Further, it should be apparent that all the network devices "N1" through "N27" 12 and all the master clock devices "GM1" through "GM4" 16 are configured for establishing wireless data links 16 (illustrated as curved lines radiating from each device 12 or 15), even though only the wireless data links for the network device "N1" 12 and the master clock device "GM1" 14 are labeled with the reference numeral "16" to avoid cluttering in the figures.

Each master clock device 14 in FIGS. 1 and 2 can be configured (or at least identified) as a "Grand Master" (GM) clock device configured for providing a master clock (MC) for the data network 10 or 10'. Depending on deployment, any one or more of the master clock devices 14 can be configured to provide a Grand Master Clock according to IEEE 1588 Precision Time Protocol (PTP) that satisfies Primary Reference Time Clock (PRTC) requirements for a 4G/Long Term Evolution (LTE) communications network, for example having a constant time error (cTE) according to the International Telecommunication Union (ITU) Telecommunication Standardization Sector (ITU-T) Recommendation G.8272 of less than one hundred nanoseconds (100 ns) (e.g., a device having a cTE of fifteen nanoseconds (15 ns) or less). A master clock device 14 in FIG. 1 also can be implemented as a "floating" or "ungrounded" root providing a master clock having the best relative clock quality in a wireless ad-hoc network, for example in the event that a PRTC-based grand master clock is unavailable.

FIG. 1 illustrates the master clock devices 14 as isolated master clock devices, whereas FIG. 2 illustrates the master clock devices 14 as coordinated master clock devices that can provide distributed synchronization via a distributed clock synchronization system 18 such as wired synchronization bus, a Global Navigation Satellite System (GNSS), etc.

Figure 3:
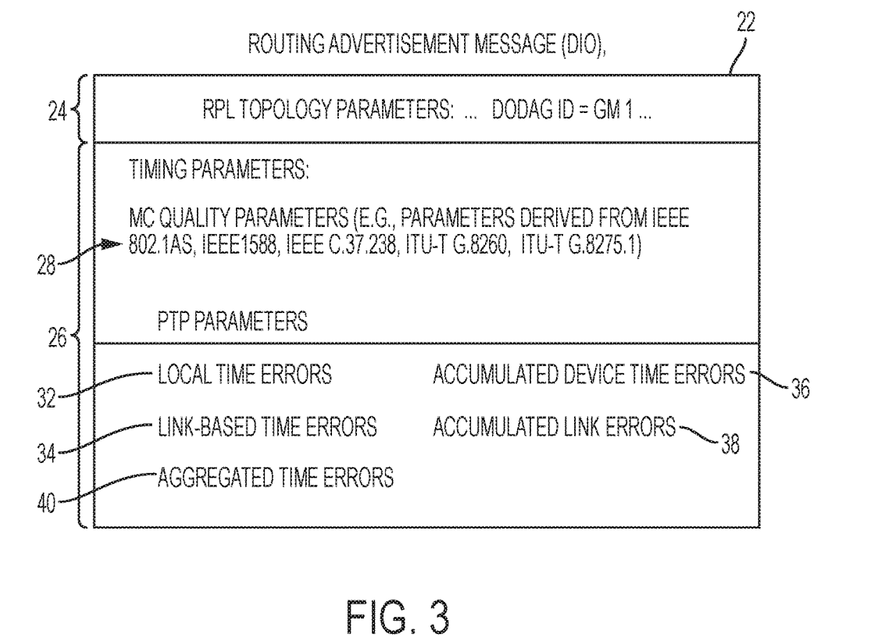
FIG. 3 illustrates an example advertisement message comprising timing information describing a quality of a network clock originated by any of the master clock devices of FIGS. 1 and 2, according to an example embodiment.

FIG. 3 illustrates an example routing advertisement message (e.g., a DIO message) 22 comprising timing information describing a quality of a network clock originated by any of the master clock devices 14 of FIGS. 1 and 2, according to an example embodiment. Each master clock device 14 is configured for generating and outputting a routing advertisement message 22, for example a RPL-based DIO message according to RFC 6550. The routing advertisement message 22 can include routing information 24 and timing information 26, where the routing information 24 can identify a root network device as a root of a DAG 20, for example based on its identifier (e.g., "DODAGID=GM1"); the routing information 24 also can specify other topology-related routing metrics as described in RFC 6551. The timing information 26, implemented for example as DIO Option "0x02" in RFC 6550 and as an extension to RFC 6551, can specify timing attributes 28 describing a quality of the corresponding master clock (e.g., "GM1"). As described in further detail below, the timing information 26 in the routing advertisement message 22 enables network devices 12 in the data network to establish, based on the timing information, an optimized loopless time topology for generation, by any one of the network devices, of a network clock that is optimized for the any one network device and synchronized to the master clock.

In particular, each network device 12 is configured for receiving one or more routing advertisement messages 22 comprising the routing information 24 and the timing information 26 describing a quality of a network clock that is originated by the master clock device 14 at a root of the corresponding DAG 20. Each network device 12 also is configured for executing an objective function for the DAG 20, where the objective function (as described, for example in RFC 6552) can be modified to execute an "Objective Function Zero" (OF0) that determines a rank based on one or more timing parameters specified in the timing attributes 28, for example maximum timing error (max|TE|) or time inaccuracy (timeInaccuracy under IEEE C37.238-2011) aggregated over the total number of hops from the master clock device 14 to the network device 12 having transmitted the routing advertisement message 22.

As described in further detail below, the objective function executed by each network device 12 can provide an optimized loopless time topology for the network clock, synchronized to the master clock device, based on the timing information; hence, each network device 12 can form an attachment 30 (i.e., attach) to a parent device in the DAG 20 based on the objective function, for optimized generation of the network clock by the network device 12. Although only a subset of the devices 12 and 14 in FIGS. 1 and 2 are illustrated as outputting a routing advertisement message 22 to avoid cluttering in the Figures, it should be apparent that all the network devices "N1" through "N27" 12 and all the master clock devices 14 can output a corresponding routing advertisement message 22. Further, although only the network devices "N16" and "N26" are illustrated with attachments (each illustrated as arrows pointing toward a root master clock device 14) 30 labeled with the reference numeral "30" in FIGS. 1 and 2 to avoid cluttering in the Figures, it should be apparent that all the network devices "N1" through "N27" 12 have one or more attachments (illustrated in FIGS. 1 and 2 as arrows) that are allocated the reference numeral "30" for purposes of the description herein.

Hence, a first-hop network device (e.g., N1, N15, or N17 in FIG. 1 or 2) 12, in response to receiving the routing advertisement message 22 from a master clock device 14, can generate its own network clock in response to forming an attachment 30 to a master clock device (e.g., GM1, GM2, GM3, or GM4) 14, and further based on synchronizing (via the attachment 30) to the master clock device 14 that acts as the parent device. Each first-hop network device also can output its own updated routing advertisement message 22 based on updating the routing information 24 in accordance with RFC 6550, and updating the timing information 26 to include local time error attributes associated with the network device 12, link-based time error attributes 34, and aggregated timing information along the path from the advertising network device 12 to the master clock device 14 such as aggregated device time error attributes 36, accumulated link error attributes 38, and aggregated time error attributes 40 describing a total time error along the path (including all devices and links) from the advertising network device 12 back to the master clock device 14.

Hence, each successive network device (e.g., N2) 12 detecting an updated routing advertisement message 22 from a parent network device (e.g., N1) 12 attached within a DAG 20 can selectively attach to the DAG 20, as described in RFC 6552, based on the successive network device (e.g., N2) 12 executing a corresponding objective function to determine if the attached network device (e.g., "N1") 12 in the DAG 20 identified in the updated routing advertisement message 22 provides an optimized loopless time topology that enables the successive network device (e.g., N2) 12 to generate an optimized network clock synchronous with the master clock device 14 rooted at the DAG 20. Hence, as illustrated in FIG. 1, the network device "N2" can choose to form an attachment 30 with the network device "N1" 12 and not to the network device "N15", based on the network device "N1" advertising a corresponding generated network clock having better aggregated quality than the network clock generated by the network device "N15".

As described in further detail below with respect to FIGS. 5A and 5B, while the master clock devices 14 in FIG. 1 can establish respective directed acyclic graphs (DAGs) 20 based on the respective independent time sources, the distributed synchronization between the master clock devices 14 via the distributed clock synchronization system 18 in FIG. 2 enable a master clock device 14 (e.g., N2, N7, N9, N16, N20, N21, or N23 in FIG. 2) to establish concurrent attachments to different DAGs and generate an multiple network clocks from the multiple master clock devices 14, and/or aggregated network clock based on the respective master clock devices 14.

Figure 4:
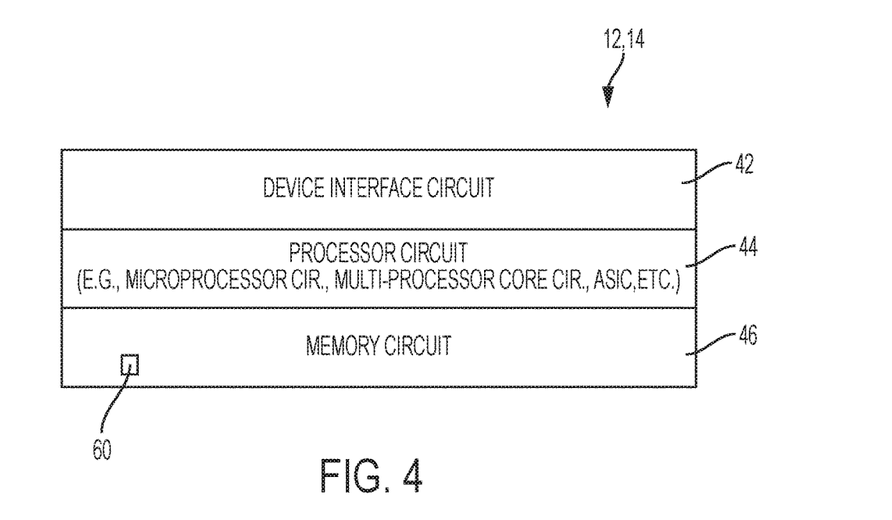
FIG. 4 illustrates an example implementation of any one of the network devices of FIGS. 1 and 2, according to an example embodiment.

FIG. 4 illustrates an example implementation of any one of the devices 12 and/or 14 of FIG. 1, according to an example embodiment. Each apparatus 12 and/or 14 can include a device interface circuit 42, a processor circuit 44, and a memory circuit 46. The device interface circuit 42 can include one or more distinct physical layer transceivers for communication with any one of the other devices 12 and/or 14; the device interface circuit 42 also can include an IEEE based Ethernet transceiver for communications with the devices of FIG. 1 via any type of data link (e.g., a wired or wireless link, an optical link, etc.) 16. The processor circuit 44 can be configured for executing any of the operations described herein, and the memory circuit 46 can be configured for storing any data or data packets as described herein.

Any of the disclosed circuits of the devices 12 and/or 14 (including the device interface circuit 42, the processor circuit 44, the memory circuit 46, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 46) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 46 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 46 can be implemented dynamically by the processor circuit 44, for example based on memory address assignment and partitioning executed by the processor circuit 44.

Figure 5A:
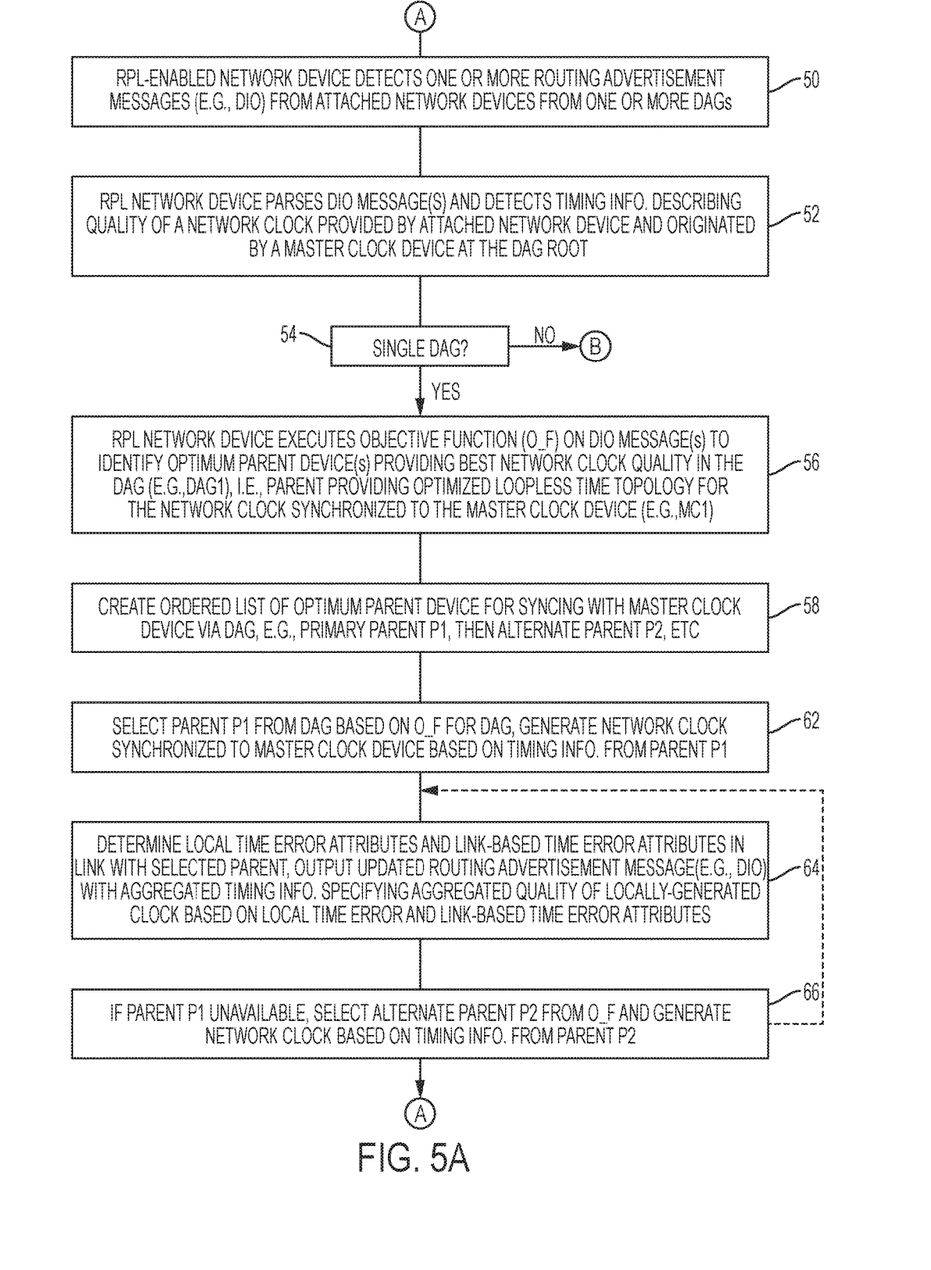
FIGS. 5A and 5B illustrate an example method by the apparatus of FIGS. 1 and/or 2 of optimized generation of a network clock within a directed acyclic graph rooted at a master clock device, according to an example embodiment.
Figure 5B:
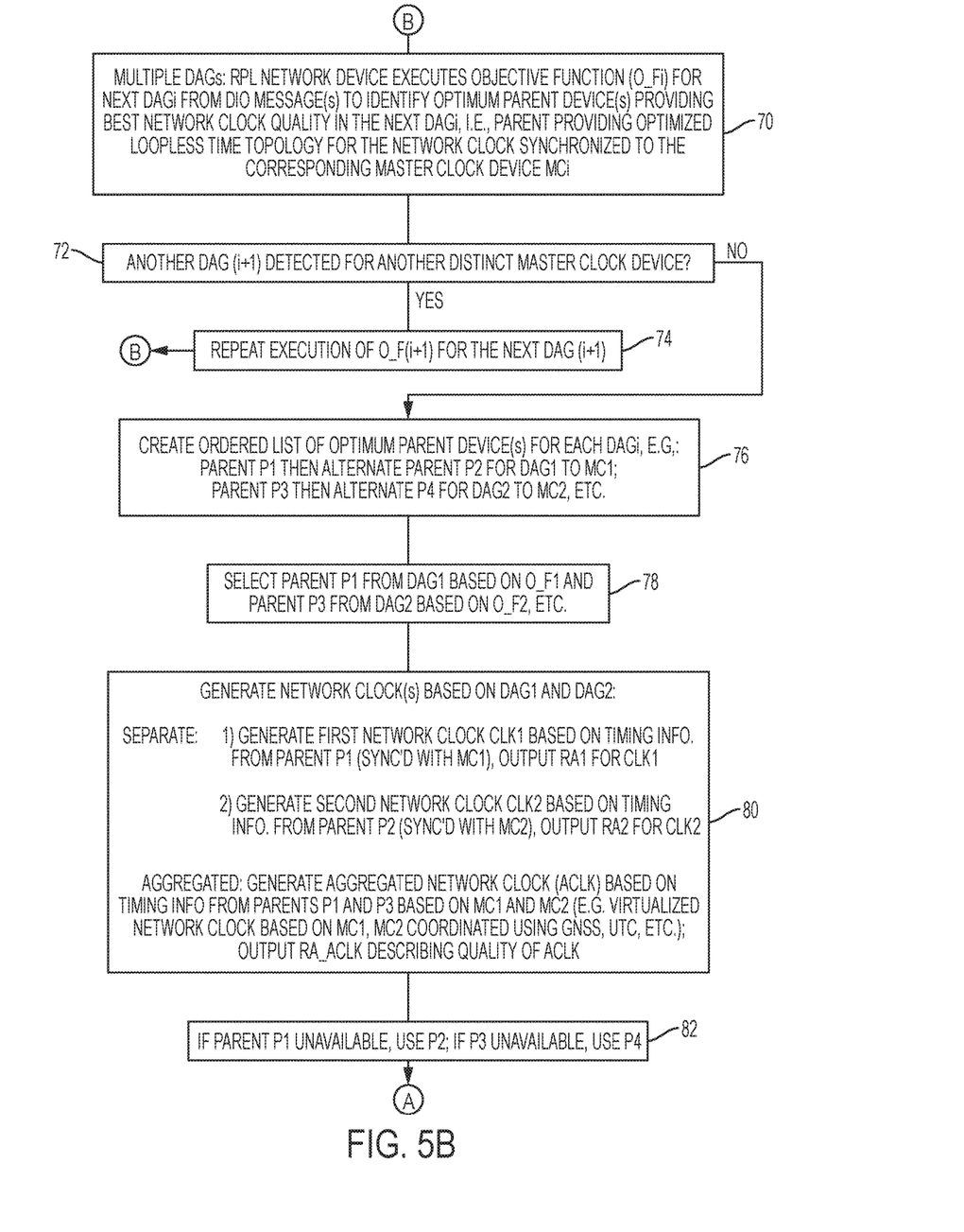

FIGS. 5A and 5B illustrate an example method by the apparatus of FIGS. 1 and/or 2 of optimized generation of a network clock within a directed acyclic graph rooted at a master clock device, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 5A, the device interface circuit 42 of each network device 12 is configured for detecting and receiving, in operation 50 one or more routing advertisement messages 22 (e.g., a DIO) from one or more master clock devices 14 rooting respective DAGs 20, and/or from one or more network devices 12 attached to one or more of the DAGs 20. For example, FIG. 1 illustrates the network devices "N1", "N15", and "N17" 12 receiving a routing advertisement message 22 from the master clock devices "GM1", "GM3", and "GM4" 14, respectively. FIG. 1 also illustrates other network devices 12 receiving updated routing advertisement messages 22 from attached network devices 12: for example FIG. 1 illustrates network devices "N6", "N10", and "N14" 12 receiving updated routing advertisement messages 22 from the respective attached network devices "N4", "N8", and "N13" 12 attached to the DAG 20a rooted by the master clock device "GM1"; FIG. 1 also illustrates network devices "N20" and "N27" receiving updated routing advertisement messages 22 from the respective attached network devices "N17" and "N25" 12 attached to the DAG 20c rooted by the master clock device "GM4" 14.

FIG. 2 illustrates that a network device 12 can receive a routing advertisement message 22 from attached network devices 12 attached to respective DAGs 20 rooted to distinct master clock devices 14. For example, FIG. 2 illustrates that the network device "N2" 12 can receive an updated routing advertisement message 22 from the attached network device "N1" 12 (belonging to the DAG 20a rooted by the master clock device "GM1" 14), and a second routing advertisement message 22 from the master clock device "GM2"; FIG. 2 also illustrates that the network device "N20" can receive an updated routing advertisement message 22 from the attached network device "N15" 12 (belonging to the DAG 20b rooted by the master clock device "GM3" 14), and a second updated routing advertisement message 22 from the attached network device "N17" 12 (belonging to the DAG 20c rooted by the master clock device "GM4" 14).

The processor circuit 44 in each network device 12 is configured for parsing in operation 52 the received routing advertisement message 22 for the routing information 24 and/or the timing information 26. As described in RFC 6550, a network device 12 can execute different objective functions for respective RPL instances; hence, a network device 12 can execute one objective function (O_F) based on the timing information 26 for generating a network clock, and another objective function based on the routing information 24 for forwarding data to a root, for example for forwarding sensor data to a prescribed destination.

If in operation 54 the processor circuit 44 of a network device 12 determines that the received routing advertisement messages 22 are originated from different master clock devices 14 as illustrated in FIG. 2, the processor circuit 44 continues operations as described below with respect to FIG. 5B.

If in operation 54 the processor circuit 44 of a network device 12 determines that all the received routing advertisement messages 22 are from a single DAG 20 rooted at a single master clock device 14 (as illustrated in FIG. 1), the processor circuit 44 of the network device 12 in operation 56 executes a time-optimized objective function (O_F) on the received routing advertisement messages 22 to identify the optimum parent device providing the best network clock quality in the DAG 20 relative to the master clock device 14; in other words, the processor circuit 44 can be configured to execute an "Objective Function Zero" (OF0) that determines a rank based on one or more timing parameters specified in the timing attributes 28, for example maximum timing error (max|TE|) or time inaccuracy (timeInaccuracy under IEEE C37.238-2011) aggregated over the total number of hops from the master clock device 14 to the network device 12 having transmitted the routing advertisement message 22. Hence, the processor circuit 44 in operation 56 can execute the objective function to determine the path (as advertised by the different attached network devices) providing the best network clock originated by the master clock device 14.

The processor circuit 44 of the network device 12 in operation 58 can create in the memory circuit 46 an ordered list of the optimum parent devices for synchronizing with the master clock device 14 via the DAG 20; for example, processor circuit 44 of the network device "N4" 12 of FIG. 1 can store in its memory circuit 46 a preferred timing parent list 60 that identifies the network device "N1" 12 as its preferred parent "P1", and the network device "N3" 12 as its alternate parent "P2"; the processor circuit 44 of the network device "N4" also can store a next-preferred candidate parent "N7" for use if the network devices "N1" and "N3" are unavailable, etc.

The processor circuit 44 of the network device (e.g., "N4") 12 can select in operation 62 its preferred parent "P1" for attachment 30 to the parent network device (e.g., "N1") 12 based on executing the objective function for the DAG 20 based on the received timing information 26 in the received routing advertisement messages 22. In response to the network device (e.g. "N4") 12 attaching to the parent device (e.g., "P1=N1") based on execution of the objective function optimized for the loopless time topology synchronized to the master clock device (e.g., "GM1") 14, the network device (e.g., "N4") 12 in operation 62 can locally generate its network clock based on the timing information received from its preferred parent device (e.g., "P1=N1").

The processor circuit 44 of the network device (e.g., "N4") 12, in response to attaching in operation 62 to its parent device (e.g., "N1") 12 and generating its corresponding network clock, also can determine in operation 64 its local error attributes in accordance with any one of numerous timing protocols (e.g., PTP, etc.), described in further detail below. In addition to various master clock-based quality parameters and PTP parameters, the processor circuit 44 in operation 64 can detect the local time error attributes 32 and the link-based time error attributes 34, and add the attributes to the updated routing advertisement message 22; the processor circuit 44 also can calculate, based on the local time error attributes 32 and the link-based time error attributes 34, the aggregated device time error attributes 36, the accumulated link error attributes 38, and the aggregated time error attributes 40. The processor circuit 44 can output the updated routing advertisement message 22 specifying the locally-generated local time error attributes 32, link-based time error attributes 34, aggregated device time error attributes 36, accumulated link error attributes 38, and the aggregated time error attributes 40. Hence, the locally-generated routing advertisement message 22 advertises an aggregated quality of the network clock that is originated by the master clock device 14 and generated by the network device 12.

As apparent from the foregoing, if in operation 66 the processor circuit 44 of the network device (e.g., "N22" of FIG. 1) 12 determines that the preferred parent (e.g., "P1=N20") becomes unavailable for example due to a link breakage 68 (e.g., excessive wireless interference), the processor circuit 44 of the network device (e.g., "N22") can select the alternate parent (e.g., "P2=N21") 12 from its preferred timing parent list 60, enabling the processor circuit 44 in operation 66 to generate a second (alternate) network clock that is synchronized to the master clock (e.g., "GM4") 14 based on the corresponding timing information 26 from the alternate parent (e.g., "P2=N21") 12. As illustrated in FIG. 5A, the processor circuit 44 can repeat operation 64 in response to selecting the alternate parent device to update the routing advertisement message 22 to specify the quality of the second (alternate) network clock synchronized via the alternate parent.

FIG. 5B illustrates an example execution of the objective function in response to a network device receiving routing advertisement messages 22 originated from different master clock devices 14, as illustrated in FIG. 2. Referring to operation 70, the processor circuit 44 can execute a corresponding objective function (as in operation 56 of FIG. 5A) for each DAG 20 to identify the optimum parent device providing the best network clock quality synchronized to the corresponding master clock device 14 via the corresponding DAG 20. For example, assuming the network device "N20" 12 receives routing advertisement messages 22 (each describing a quality of a corresponding network clock originated by the master clock device "GM4" 14) from the network device "N17" 12 and the network device "N19" 12, the processor circuit 44 of the network device "N20" 12 in operation 70 can execute the objective function (as in operation 56 of FIG. 5A) and identify the network device the network device "N17" 12 as providing the best network clock quality in the DAG 20c rooted by the master clock device "GM4" 14.

Assume further in operation 72 that the processor circuit 44 of the network device "N20" 12 determines in operation 72 that another DAG 20 (e.g., 20b) was detected in response to the device interface circuit 42 of the network device "N20" 12 having received routing advertisement messages 22 from the network devices "N15" and "N16" 12. Hence, the processor circuit 44 of the network device "N20" 12 in operation 74 is configured for repeating operation 70 for the next DAG 20b in response to detection thereof, according to the corresponding objective function (O_Fi) for the DAG (DAGi) 20 providing reachability to the corresponding master clock device (MCi) 14, based on the received timing information 26 in the received routing advertisement messages 22 from the network devices "N15" and "N16" 12. Operation 70 can be repeated for each detected DAG 20 until all DAGs 20 have been processed.

Referring to operation 76, the processor circuit 44 creates the preferred timing parent list 60 (similar to operation 58), where the preferred timing parent list 60 specifies ordered list of parent devices for each detected DAG 20. For example, the processor circuit 44 of the network device "N20" 12 in operation 76 can update the preferred timing parent list 60 to specify the preferred parent "P1=N17" and the alternate parent "P2=N19" for the DAG 20c providing reachability to the first master clock device "MC1=GM4" 14, and the preferred parent "P3=N15" and the alternate parent "P4=N16" for the DAG 20b providing reachability to the second master clock device "MC2=GM3" 14, etc.

Hence, the processor circuit 44 of the network device "N20" 12 in operation 78 can select for attachment 30 the parent "N17" 12 from the DAG 20c, based on the corresponding objective function (O_F1) for reaching the master clock GM4" 14, and the processor circuit 44 of the network device "N20" 12 can select for attachment 30 the parent "N15" 12 from the DAG 20b, based on the corresponding objective function (O_F2) for reaching the master clock device "GM3" 14.

Hence, the processor circuit 44 of the network device "N20" 12 in operation 80 can generate one or more network clocks that are optimized based on attachment to the DAGs 20c and 20d. In one example, the processor circuit 44 of the network device "N20" 12 can generate separate network clocks that are individually synchronized to the respective master clocks "GM3" and "GM4" 14. For example, the processor circuit 44 of the network device "N20" 12 in operation 80 can generate a first network clock (CLK1) based on the timing information 26 from the routing advertisement message 22 output by the parent network device "N17" 12 that is synchronized with the first master clock device "MC1=GM4" 14; the processor circuit 44 also can generate an updated routing advertisement message "RA1" 22, as described with respect to operation 64 of FIG. 5A, having updated timing information 26 describing the quality of the first network clock (CLK1) that is synchronous to the first master clock device "MC1=GM4" 14 via the preferred parent "P1=N17". The processor circuit 44 of the network device "N20" 12 in operation 80 also can generate a second network clock (CLK2) based on the timing information 26 from the routing advertisement message 22 output by the parent network device "N15" 12 that is synchronized with the second master clock device "MC2=GM3" 14; the processor circuit 44 also can generate an updated routing advertisement message "RA2" 22, as described with respect to operation 64 of FIG. 5A, having updated timing information 26 describing the quality of the second network clock (CLK2) that is synchronous to the second master clock device "MC2=GM3" 14 via the preferred parent "P3=N15".

The processor circuit 44 of the network device "N20" 12 in operation 80 also can generate an aggregated network clock (ACLK) (e.g., an aggregated version of the first network clock (CLK1) and the second network clock (CLK2), based on the timing information from the parent network devices "P1=N17" and "P3=N15" 12 that are synchronized to the respective master clock devices "MC1=GM4" and "MC2=GM3" 14, respectively. As described previously with respect to FIG. 2, the distributed clock synchronization system 18 (implemented, for example, as a wired synchronization bus, GNSS, etc., Coordinated Universal Time (UTC) synchronization, PTP-based synchronization using International Atomic Time, etc.), enables synchronization between the master clock devices "GM1", "GM2", "GM3", and "GM4" 14. Hence, the aggregated network clock (ACLK) can provide overall improved accuracy based on the combination of timing information 26 between two or more master clock devices 14.

The processor circuit 44 of the network device "N20" 12 in operation 80 also can generate an updated routing advertisement message "RA_ACLK" 22, as described previously with respect to operation 64 of FIG. 5A, having updated timing information 26 describing the quality of the second aggregated network clock (ACLK) that is synchronous to the both the first master clock device "MC1=GM4" 14 (via the preferred parent "P1=N17") and the second master clock device "MC2=GM3" 14 (via the preferred parent "P3=N15"). As described previously, the timing information 26 can describe all the timing attributes described herein to enable another network device to determine whether to attached to the network device "N20" 12 based on the aggregated network clock (ACLK).

As described previously with respect to operation 66 in FIG. 5A, the processor circuit 44 of the network device "N20" 12 in operation 82 can change parents if a current parent is unavailable; hence, if the parent "P1=N17" is unavailable, the processor circuit 44 can use the alternate parent "P2=N19" for maintaining synchronization in operation 80 with the master clock "GM4"; if the parent "P3=N15" is unavailable, the processor circuit 44 can use the alternate parent "P4=N16" for maintaining synchronization in operation 80 with the master clock "GM3".

According to example embodiments, timing information can be added as a metric container to routing advertisement messages (e.g., RPL DIO messages) to enable a network device to execute an optimization function for identifying a parent network device for attachment to a DAG providing reachability to a master clock device rooted at the DAG. The objective function can apply a combination of the timing information and the network topology information to identify the best parent device for optimized generation of the network clock by the network device. Hence, a network device can distinguish between a first path having a relatively long number of hops via network devices utilizing high-precision clocks, as opposed to a second path having a shorter number of hops than the first path but composed of network devices utilizing lower-precision clocks; in another example embodiment, a network device can distinguish between the first path (having the long number of hops via the high-precision network devices), a second path (having a shorter number of hops via the lower-precision network devices), and a third path having a combination of the high-precision network devices, the lower-precision network devices, and/or non-timing aware network devices (i.e., network devices incapable of recovering a clock according to any of the above-described timing protocols such as PTP, etc.). Various timing details can be provided in the timing information, enabling different objective functions to be utilized depending on the relevant systems and applications supported by the network device executing the objective function.

The following description provides additional example information by way of illustration that can be used in the timing information 26 of a routing advertisement message 22, and/or which can be used by a network device executing an objective function for determining a optimized loopless time topology by the DAG.

The IEEE 1588 BMCA assumes two types of clocks can be implemented: an ordinary clock (OC), defined as a clock with one PTP port that can be either selected as the master clock or can be a slave clock, i.e. a leaf clock in the timing tree; and a boundary clock (BC), defined as a clock with more than one PTP port, with one slave port acquiring the time and at least one master port retransmitting this time.

The timing information 26 can include various parameters related to the performance of a clock or of the network. Example parameters can include the BC performance characteristics defined by a considered profile; the definition and the description of static device characteristics according to different protocol standards, for example IEEE 1588 profile and clock characteristics for their industry, the timeInaccuracy parameter from IEEE C37.238 or the max|TE| parameter from the ITU-T Recommendation G.8260; meanPathDelay; clockOffset.

The timing information 26 also can include statistics or metrics that a network device can perform based on the profile, clock implementation and environment, for example: observedParentOffsetScaledLogVariance; observedParentClockPhaseChangeRate; average and standard deviation (stdDev) of meanPathDelay and clockOffset; MTIE, TDEV; timeInaccuracy; stdDev, minimum, maximum and average one-way delays; turnaround time (e.g., the delay to send a response to a request received on same port); sojourn time (e.g., the time between the receipt of the most recent sync message on the slave port of the BC and the transmission of a sync message on the master port being considered). In the example of Synchronous Ethernet, QL status (e.g. when the SyncE control plane has a degraded signal) also can be included in the timing information 26.

Execution of the objective function can be based on the rank computation as defined in RFC 6550, where the rank computation is based on the timeInaccuracy parameter: the timeInacuracy parameter can be the maximum inaccuracy of a clock source as guaranteed by the manufacturer of the clock source. Hence, the objective function executed by each network device can optimize the DAG by building a stable topology that minimizes the sum of the worst inaccuracy over the hops, as for example:

rank(child)=rank(parent)+timeInaccuracy(Child)+ asymmetryAssessmentAccuracy(parent−child)

The timeInaccuracy parameter can be measured in units of nanoseconds, although the units can be larger or smaller depending on the objective function or deployment. If link asymmetry is known to contain an error, the asymmetryAssessmentAccuracy (parent-child) parameter can be included in the Rank.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a network device in a data network comprising a low power and lossy network, one or more advertisement messages comprising network topology information and timing information, the timing information describing a quality of a network clock that is originated by a master clock device at a root of a directed acyclic graph (DAG) in the low power and lossy network and that is generated by an attached network device belonging to the DAG and having output the one or more advertisement messages, the network topology information describing one or more topology metrics for generating a route for routing of network traffic in the DAG via the attached network device;
the network device executing an objective function for the DAG providing an optimized loopless time topology for the network clock, synchronized to the master clock device, based on the timing information and the network topology information; and
the network device attaching to a parent device in the DAG based on the objective function, for optimized generation of the network clock by the network device relative to the routing of network traffic in the DAG.

2. The method of claim 1, further comprising receiving a plurality of said advertisement messages from respective attached network devices belonging to the DAG, and wherein the executing of the objective function comprises selecting the parent device among the attached network devices belonging to the DAG, based on the timing information and the network topology information from the respective advertisement messages.

3. The method of claim 2, further comprising:
selecting a second parent device, among the attached network devices, for attachment in the DAG based on receiving from the second parent device a corresponding advertisement message comprising corresponding network topology information and timing information describing the corresponding quality of the network clock generated by the second parent device, and based on applying the timing information and the network topology information of the second parent device to the objective function; and
generating the network clock, based on synchronizing to the master clock device via the second parent device in the DAG.

4. The method of claim 1, further comprising:
determining local time error attributes associated with the network device;
determining link-based time error attributes associated with a data link between the parent device and the network device; and
the network device outputting a locally-generated advertisement message specifying aggregated timing information based on the local time error attributes and the link-based time error attributes, the locally-generated advertisement message advertising an aggregated quality of the network clock that is originated by the master clock device and generated by the network device.

5. The method of claim 4, further comprising:
selecting a second parent device for attachment in the DAG based on receiving from the second parent device a corresponding advertisement message comprising corresponding network topology information and timing information describing the corresponding quality of the network clock generated by the second parent device, and based on applying the timing information and the network topology information of the second parent device to the objective function;
generating the network clock, based on synchronizing to the master clock device via the second parent device in the DAG; and
the network device outputting a second locally-generated advertisement message specifying second aggregated timing information based on the corresponding timing information supplied by the second parent device, the local time error attributes and corresponding link-based time error attributes associated with the second parent device, the second locally-generated advertisement message advertising a second aggregated quality of the network clock that is generated by the network device and synchronized to the master clock device via the second parent device.

6. The method of claim 1, wherein the timing information includes any one of precision time protocol (PTP) parameters for describing the quality of the network clock, device timing quality information for any one or more of any network device along a path in the DAG between and including the parent device and the master clock device, link timing quality information for any one or more of any data link along the path, aggregated PTP parameters along the path, aggregated device timing quality information along the path, or aggregated link timing quality information along the path.

7. The method of claim 1, further comprising:
receiving, by the network device, a second advertisement message comprising corresponding network topology information and timing information, the corresponding timing information describing a quality of a second network clock that is originated by a second master clock device at the corresponding root of a second DAG of the data network;
the network device executing a second objective function for the second DAG providing a corresponding optimized loopless time topology for the second network clock, synchronized to the second master clock device, based on the corresponding network topology information and timing information in the second advertisement message; and
the network device attaching to a second parent device in the second DAG based on the second objective function, for optimized generation of the second network clock by the network device.

8. The method of claim 7, further comprising the network device generating an aggregated network clock based on the master clock device in the DAG and the second master clock device in the second DAG.

9. An apparatus comprising:
a device interface circuit configured for receiving one or more advertisement messages comprising network topology information and timing information, the timing information describing a quality of a network clock that is originated by a master clock device at a root of a directed acyclic graph (DAG) in a low power and lossy network of a data network and wherein the network clock is generated by an attached network device belonging to the DAG and having output the one or more advertisement messages, the network topology information describing one or more topology metrics for generating a route for routing of network traffic in the DAG via the attached network device; and
a processor circuit configured for executing an objective function for the DAG providing an optimized loopless time topology for the network clock, synchronized to the master clock device, based on the timing information and the network topology information;
the processor circuit further configured for causing the apparatus to attach to a parent device in the DAG based on the objective function, for optimized generation of the network clock by the apparatus relative to the routing of network traffic in the DAG.

10. The apparatus of claim 9, wherein:
the device interface circuit further is configured for receiving a plurality of said advertisement messages from respective attached network devices belonging to the DAG; and
the processor circuit further is configured for selecting the parent device among the attached network devices belonging to the DAG, based on the timing information and the network topology information from the respective advertisement messages.

11. The apparatus of claim 10, wherein the processor circuit further is configured for:
selecting a second parent device, among the attached network devices, for attachment in the DAG based on receiving from the second parent device a corresponding advertisement message comprising the corresponding network topology information and timing information describing the corresponding quality of the network clock generated by the second parent device, and based on applying the timing information and the network topology information of the second parent device to the objective function; and
generating the network clock, based on synchronizing to the master clock device via the second parent device in the DAG.

12. The apparatus of claim 9, wherein the processor circuit further is configured for:
determining local time error attributes associated with the apparatus;
determining link-based time error attributes associated with a data link between the parent device and the apparatus; and
generating and outputting, via the device interface circuit, a locally-generated advertisement message specifying aggregated timing information based on the local time error attributes and the link-based time error attributes, the locally-generated advertisement message advertising an aggregated quality of the network clock that is originated by the master clock device and generated by the apparatus.

13. The apparatus of claim 12, wherein the processor circuit further is configured for:
selecting a second parent device for attachment in the DAG based on receiving from the second parent device a corresponding advertisement message comprising corresponding network topology information and timing information describing the corresponding quality of the network clock generated by the second parent device, and based on applying the timing information and the network topology information of the second parent device to the objective function;
generating the network clock, based on synchronizing to the master clock device via the second parent device in the DAG; and
generating and outputting, via the device interface circuit, a second locally-generated advertisement message specifying second aggregated timing information based on the corresponding timing information supplied by the second parent device, the local time error attributes and corresponding link-based time error attributes associated with the second parent device, the second locally-generated advertisement message advertising a second aggregated quality of the network clock that is generated by the apparatus and synchronized to the master clock device via the second parent device.

14. The apparatus of claim 9, wherein the timing information includes any one of precision time protocol (PTP) parameters for describing the quality of the network clock, device timing quality information for any one or more of any network device along a path in the DAG between and including the parent device and the master clock device, link timing quality information for any one or more of any data link along the path, aggregated PTP parameters along the path, aggregated device timing quality information along the path, or aggregated link timing quality information along the path.

15. The apparatus of claim 9, wherein:
the device interface circuit further is configured for receiving a second advertisement message comprising corresponding network topology information and timing information, the corresponding timing information describing a quality of a second network clock that is originated by a second master clock device at the corresponding root of a second DAG of the data network;

the processor circuit further is configured for executing a second objective function for the second DAG providing a corresponding optimized loopless time topology for the second network clock, synchronized to the second master clock device, based on the corresponding network topology information and timing information in the second advertisement message; and the processor circuit further is configured for attaching to a second parent device in the second DAG based on the second objective function, for optimized generation of the second network clock by the network device.

16. The apparatus of claim 15, wherein the processor circuit further is configured for generating an aggregated network clock based on the master clock device in the DAG and the second master clock device in the second DAG.

17. One or more non-transitory tangible media encoded with logic for execution by a machine and when executed by the machine operable for:

receiving, by the machine implemented as a network device in a data network comprising a low power and lossy network, one or more advertisement messages comprising network topology information and timing information, the timing information describing a quality of a network clock that is originated by a master clock device at a root of a directed acyclic graph (DAG) in the low power and lossy network and that is generated by an attached network device belonging to the DAG and having output the one or more advertisement messages, the network topology information describing one or more topology metrics for generating a route for routing of network traffic in the DAG via the attached network device;

the network device executing an objective function for the DAG providing an optimized loopless time topology for the network clock, synchronized to the master clock device, based on the timing information and the network topology information; and the network device attaching to a parent device in the DAG based on the objective function, for optimized generation of the network clock by the network device relative to the routing of network traffic in the DAG.

18. The one or more non-transitory tangible media of claim 17, further operable for:

determining local time error attributes associated with the network device;

determining link-based time error attributes associated with a data link between the parent device and the network device; and the network device outputting a locally-generated advertisement message specifying aggregated timing information based on the local time error attributes and the link-based time error attributes, the locally-generated advertisement message advertising an aggregated quality of the network clock that is originated by the master clock device and generated by the network device.

19. The one or more non-transitory tangible media of claim 17, wherein the timing information includes any one of precision time protocol (PTP) parameters for describing the quality of the network clock, device timing quality information for any one or more of any network device along a path in the DAG between and including the parent device and the master clock device, link timing quality information for any one or more of any data link along the path, aggregated PTP parameters along the path, aggregated device timing quality information along the path, or aggregated link timing quality information along the path.

20. The one or more non-transitory tangible media of claim 17, further operable for:

receiving, by the network device, a second advertisement message comprising corresponding network topology information and timing information, the corresponding timing information describing a quality of a second network clock that is originated by a second master clock device at the corresponding root of a second DAG of the data network;

the network device executing a second objective function for the second DAG providing a corresponding optimized loopless time topology for the second network clock, synchronized to the second master clock device, based on the corresponding network topology information and timing information in the second advertisement message; and the network device attaching to a second parent device in the second DAG based on the second objective function, for optimized generation of the second network clock by the network device.

* * * * *